United States Patent
Moertelmaier

(10) Patent No.: US 10,712,546 B1
(45) Date of Patent: Jul. 14, 2020

(54) ILLUMINATION SOURCE FOR STRUCTURED ILLUMINATION MICROSCOPY

(71) Applicant: Keysight Technologies, Inc., Minneapolis, MN (US)

(72) Inventor: Manuel Moertelmaier, Wels (AT)

(73) Assignee: Keysight Technologies, Inc., Santa Rosa, CA (US)

( * ) Notice: Subject to any disclaimer, the term of this patent is extended or adjusted under 35 U.S.C. 154(b) by 55 days.

(21) Appl. No.: 15/785,157

(22) Filed: Oct. 16, 2017

(51) Int. Cl.
| | |
|---|---|
| *G02F 1/29* | (2006.01) |
| *G02B 26/00* | (2006.01) |
| *G02F 1/03* | (2006.01) |
| *G02B 26/08* | (2006.01) |
| *G02B 27/00* | (2006.01) |
| *G02B 21/06* | (2006.01) |

(52) U.S. Cl.
CPC ............. *G02B 21/06* (2013.01); *G02F 1/292* (2013.01)

(58) Field of Classification Search
CPC .......... G02F 1/29; G02F 1/1015; G02F 1/315; G02F 1/31; G02F 1/0333; G02B 26/0841; G02B 26/001; G02B 6/2766; G02B 27/283; G02B 26/105; G02B 6/29358; B82Y 20/00
USPC ........ 359/315, 290–292, 237, 298, 260–263, 359/301–303, 317–318, 223–225, 295, 359/198, 245, 577
See application file for complete search history.

(56) References Cited

U.S. PATENT DOCUMENTS

| | | | |
|---|---|---|---|
| 8,953,147 B2 | 2/2015 | Muramatsu | |
| 2012/0098951 A1 | 4/2012 | Borovytsky | |
| 2014/0293254 A1* | 10/2014 | Komatsuda | G03F 7/70108 355/67 |
| 2016/0033874 A1 | 2/2016 | Tang | |
| 2016/0274384 A1 | 9/2016 | Takiguchi | |
| 2016/0291305 A1 | 10/2016 | Moertelmaier | |
| 2017/0090297 A1 | 3/2017 | Miyake | |

FOREIGN PATENT DOCUMENTS

| | | |
|---|---|---|
| JP | 2014202867 A | 10/2014 |
| JP | 2015055706 A | 3/2015 |

OTHER PUBLICATIONS

Office Action dated Dec. 10, 2019, Japan Application No. 2016-058541.

* cited by examiner

*Primary Examiner* — Dawayne Pinkney

(57) ABSTRACT

An illumination system and a method for operating an illumination system is disclosed. The illumination system includes a generator spatial light modulator, first and second optical systems and a controller. The generator spatial light modulator is positioned to receive an incident light beam and adapted to generate first and second coherent light beams, each beam being characterized by a phase and a first light beam optical axis in a plane containing the first and second coherent light beams. The first optical system images light leaving the generator spatial light modulator on a modulator spatial light modulator that alters the phase of one of the first and second coherent light beams to generate a relative phase difference. The second optical system that images light leaving the modulator spatial light modulator onto a sample to be illuminated. The controller causes the relative phase difference to cycle through a plurality of different phase-difference values.

14 Claims, 8 Drawing Sheets

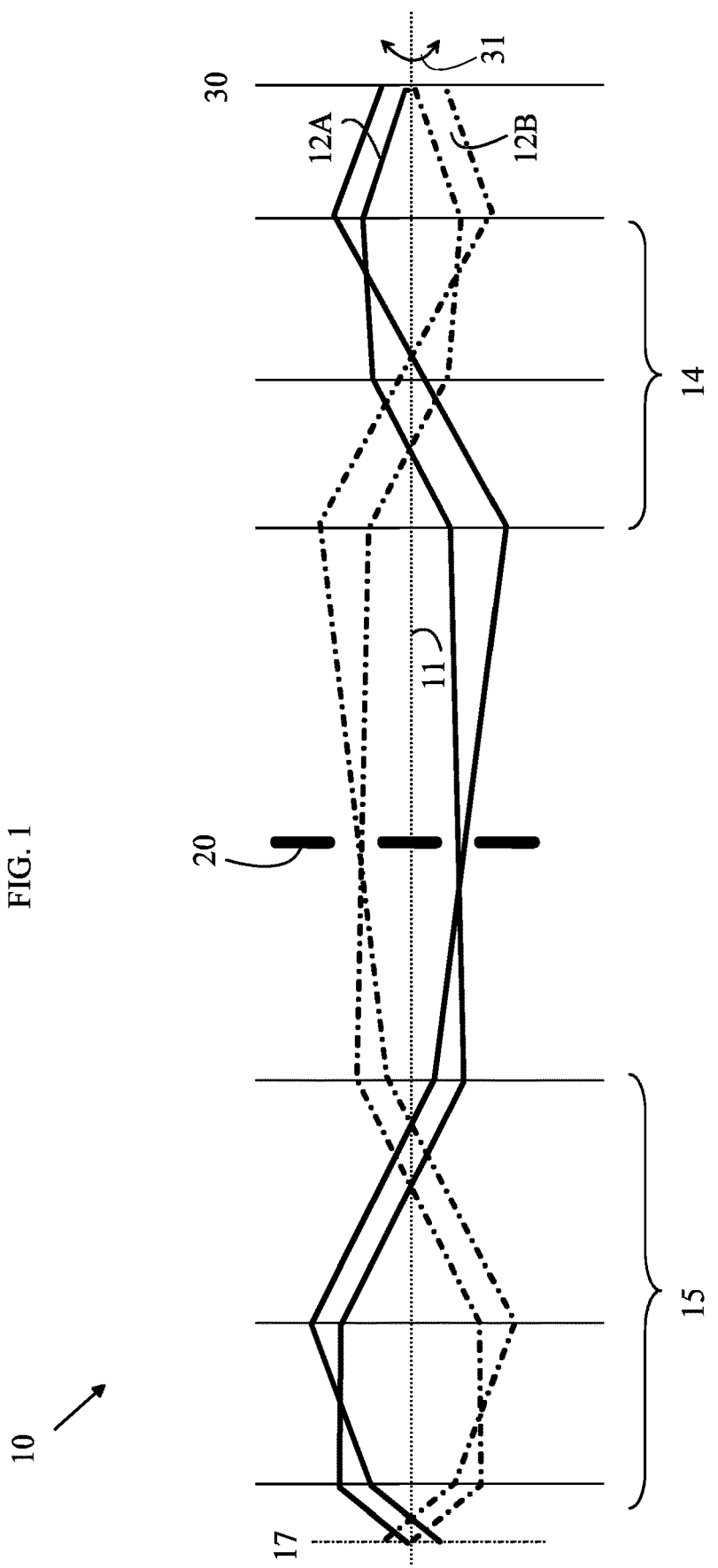

ILLUMINATION SOURCE FOR STRUCTURED ILLUMINATION MICROSCOPY

BACKGROUND

Fluorescence microscopy images the distribution of fluorescent molecules in a sample. Structured illumination microscopy (SIM) achieves a two-fold increase in spatial resolution over normal wide-field microscopy by modulating the cell sample fluorophore distribution with a spatially periodic optical signal. This creates side bands which allow access to down-modulated high spatial frequencies that are normally blocked by the finite transmission function of optical microscopes.

The periodic patterns are achieved by illuminating the sample with two or more different laser beams that interfere at the sample. Generally, these beams are chosen to be collimated. Collimated beams emerging from the microscope objective towards the sample correspond to beams that are focused on the back focal plane of the objective. Hence, the illumination light source typically requires a finite set of laser beams to be focused on the back focal plane of the objective and that the interfering beams be moved across the sample.

SUMMARY

The present invention includes an illumination system and a method for operating an illumination system. The illumination system includes a generator spatial light modulator (SLM), first and second optical systems and a controller. The generator SLM is positioned to receive an incident light beam and adapted to generate first and second coherent light beams, each beam being characterized by a phase and a first light beam optical axis in a plane containing the first and second coherent light beams. The first and second coherent light beams are characterized by an angle of rotation about the first light beam optical axis. The first optical system images light leaving the generator SLM on a modulator SLM that alters the phase of one of the first and second coherent light beams to generate a relative phase difference. The second optical system that images light leaving the modulator SLM onto a sample to be illuminated. The controller causes the relative phase difference to cycle through a plurality of different phase-difference values.

In one aspect of the invention, the controller causes the angle of rotation to cycle through three different angular values for each of the phase difference values.

In another aspect of the invention, the modulator SLM includes a transparent SLM.

In another aspect of the invention, the modulator SLM includes a reflective SLM.

In another aspect of the invention, the modulator SLM steers the first and second coherent light beams to a path characterized by a second light beam optical axis, the second light beam axis is disposed at an angle to the first light beam optical axis.

In another aspect of the invention, the second light beam optical axis lies in the same plane as the first light beam optical axis and the first and second coherent light beams.

In another aspect of the invention, the illumination system also includes a beam block that prevents light that has not been processed by the modulator SLM from reaching the sample.

In another aspect of the invention, the generator SLM includes a binary SLM.

In another aspect of the invention, the generator SLM generates third and fourth coherent light beams that enter the first optical system at an angle different from the first and second coherent light beams, respectively, the first optical system further includes a beam block that prevents the third and fourth coherent light beams from reaching the modulator SLM.

In another aspect of the invention, the controller cycles through the three different angular values for each phase-difference value prior to changing the phase-difference value.

In another aspect of the invention, the generator SLM also generates a third coherent light beam that propagates along the first optical axis, the modulator SLM steering the third coherent light beam to a path characterized by a second light beam optical axis, the second light beam axis is disposed at an angle to the first light beam optical axis.

The method of the present invention includes causing an illumination system to:

(1) generate first and second coherent light beams, each beam is characterized by a phase and a first light beam optical axis in a plane containing the first and second coherent light beams, the first and second coherent light beams are characterized by an angle of rotation about the first light beam optical axis;

(2) alter the phase of one of the first and second coherent light beams to generate a relative phase difference;

(3) image the first and second coherent light beams onto the sample; and (4) repeat the imaging of the first and the light beams for a plurality of different phase-difference values.

In another aspect of the invention, the angle of rotation is cycled through three different angular values for each of the phase difference values.

In another aspect of the invention, the method includes generating a third coherent light beam that propagates along the first optical axis and impinges on the sample.

BRIEF DESCRIPTION OF THE DRAWINGS

FIG. 1 illustrates an illumination system that can be used to provide the light pattern applied to the sample being imaged.

DETAILED DESCRIPTION

Figure 2A:
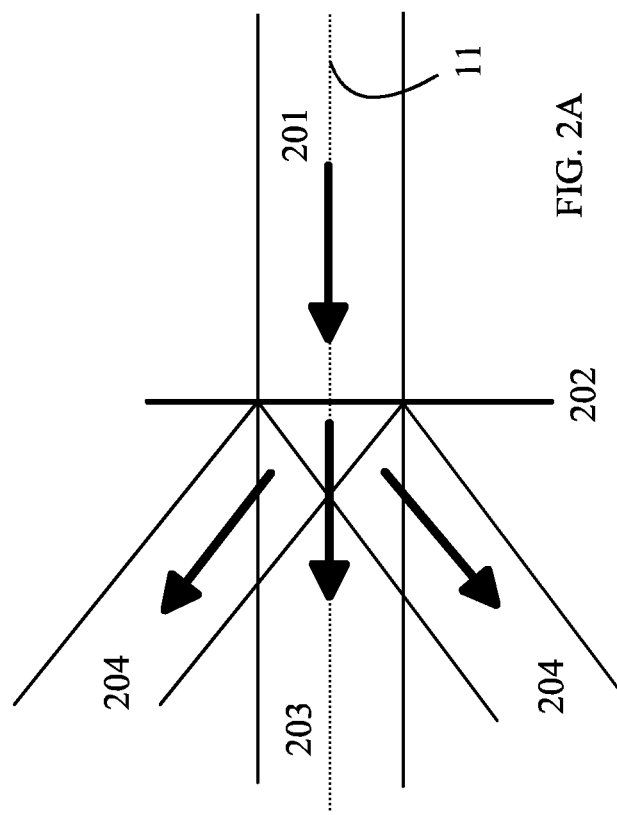
FIGS. 2A and 2B illustrate an exemplary light source according to one embodiment of the present invention.

The manner in which the present invention provides its advantages can be more easily understood with reference to FIG. 1, which illustrates an illumination system 10 that can be used to provide the light pattern applied to the sample being imaged. Light from a collimated linearly polarized light source, which is typically a laser, is split into two beams 12A and 12B by a light modulator 30. The operation of light modulator 30 will be discussed in more detail below. The beams leave light modulator 30 in the same plane and are focused on corresponding openings in mask 20 by a first optical assembly 14. Mask 20 blocks any unwanted light leaving light modulator 30. The light leaving mask 20 is then converted back to two collimated beams that strike sample 17 at different angles by lens assembly 15 in a manner that generates an interference pattern on sample 17. In prior art systems, the light pattern on the sample is scanned across the sample by moving the light pattern relative to the sample, while keeping axis 11 of the optical system perpendicular to the plane of the sample to provide the necessary images. Several images at different relative displacements are required to generate the final SIM image.

In the example shown in FIG. 1, the light beams are in the plane of the figure. The orientation of the light beams relative to optical axis 11 is determined by angle 31. The above-described scanning process must be repeated for at least three different values of angle 31 which determines the rotation of the plane of the two light beams about the optical axis to provide the final SIM image.

Figure 2B:
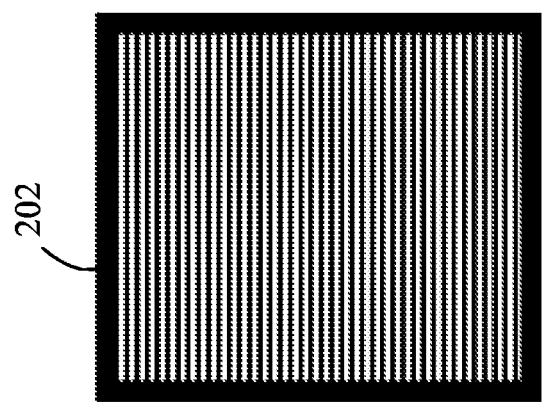

Refer now to FIGS. 2A and 2B, which illustrate an exemplary light source according to one embodiment of the present invention that can be used in the configurations described above. FIG. 2A is a cross-sectional view of a light beam processed by an SLM 202 and FIG. 2B is a front view of the pattern created on SLM 202. For the purposes of the present discussion a transmissive SLM is a device that imposes, on a beam of light that passes through the device, a set of localized shifts in phase, amplitude, or both. In contrast, a reflective SLM is a device that imposes, on a beam of light reflected off the device, a set of localized shifts in phase, amplitude or both. The SLMs, both reflective and transmissive, are usually segmented into a rectangular or square lattice of pixels. The phase and amplitude shifts are uniform over the region covered by an individual pixel, but can vary between pixels. The pixels' values for phase and amplitude shifts are addressable by software, and can vary at a frequency of at least several different values per second. Between the pixels may lie a "dead zone" that is not controllable by software and that may block or reflect or attenuate light at a constant rate. Additionally, reflection off the front or back surface of the SLM may be a source of un-modulated light.

Referring to FIG. 2A, a collimated beam of coherent light 201 impacts SLM 202 positioned at a substantially vertical angle to the optical axis 11. The SLM can be programmed to provide a pattern of pixels in which each pixel introduces a particular phase shift into the light passing through that pixel. An example of a pattern that provides a diffraction grating is illustrated in FIG. 2B. In this pattern, horizontal stripes that introduce large phase shifts are shown as bright bands, alternating periodically with equally wide regions that impart small phase shifts, shown as dark bands. This pattern results in the SLM acting as an interference grating. Part of the collimated light impacting the SLM is diffracted as shown at 204. To simplify the drawing only the first diffraction orders are shown. However, in general, multiple sets of beams will be generated, each set corresponding to a different diffraction order. These additional beams leave the grating at steeper angles than beam 204, and hence, are either lost because of the finite size of the lens shown in FIG. 1 or lost because the beams are focused to a point at a different location than mask 20 shown in FIG. 1, and hence strike the mask.

Part of the collimated light gets transmitted to form beam 203, as the grating is finitely effective, and hence, not all of the light is diffracted. This light source can flexibly produce inclined beams at an angle dependent on the pattern displayed. By rotating the pattern on the SLM, the pairs of diffracted beams are also rotated around the optical axis. This is useful to create the rotated interference patterns on the sample as described for the SIM above. However, this source will always emit beams in pairs of opposite angles, and will always produce a beam parallel to the optical axis, necessitating the mask as described above.

Figure 3B:
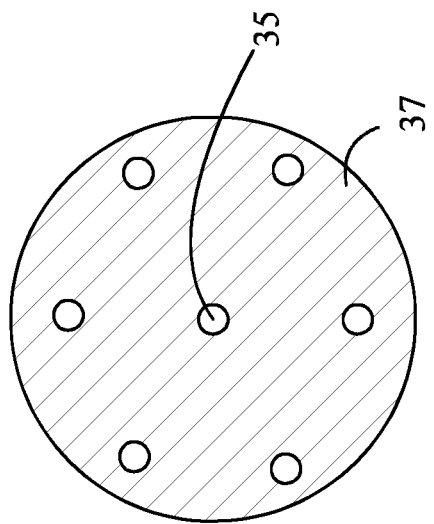
FIGS. 3A and 3B illustrate two mask embodiments that can be used to block the unwanted light for the various orientations of the laser beams.
Figure 3A:
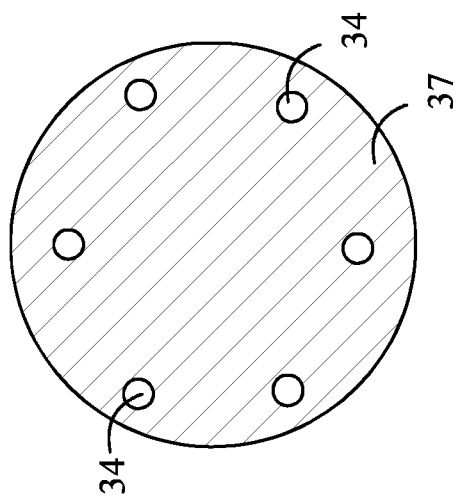

As noted above, the light source shown in FIG. 2A generates additional beams from higher diffraction orders. These additional beams must be blocked. In addition, in two-dimensional SIM imaging the non-diffracted beam 203 must also be blocked. Refer now to FIGS. 3A and 3B, which illustrate two mask embodiments that can be used to block the unwanted light for the various orientations of the laser beams. FIG. 3A is applicable for two-dimensional SIM images, and FIG. 3B is applicable for three-dimensional SIM images in which a center laser beam is also provided. For each orientation of the pair of laser beams, mask 37 includes a pair of opposing openings in an opaque material positioned to allow the desired laser beams to pass. An exemplary pair of openings are shown at 34. When the plane of the laser beams rotates, a different pair of openings provides the pass windows. Since the undesired beams generated by the higher order diffractions are in the same plane as the desired beams, the presence of the unused openings in any given configuration does not allow any significant amount of unwanted light to pass. For a three-dimensional SIM, a center beam also strikes the sample, and hence, a center opening 35 is provided.

As noted above, the SIM imaging requires that the intensity pattern generated by the laser beams in each configuration of beams be scanned across the sample. The present invention is based on the observation that rather than altering the relative placement of the illumination spot by shifting the relative physical position of the beams and the sample, the pattern can be effectively scanned by changing the relative phase of the two beams and thereby changing the pattern of illumination on the sample without moving the position of the spot.

Figure 4:
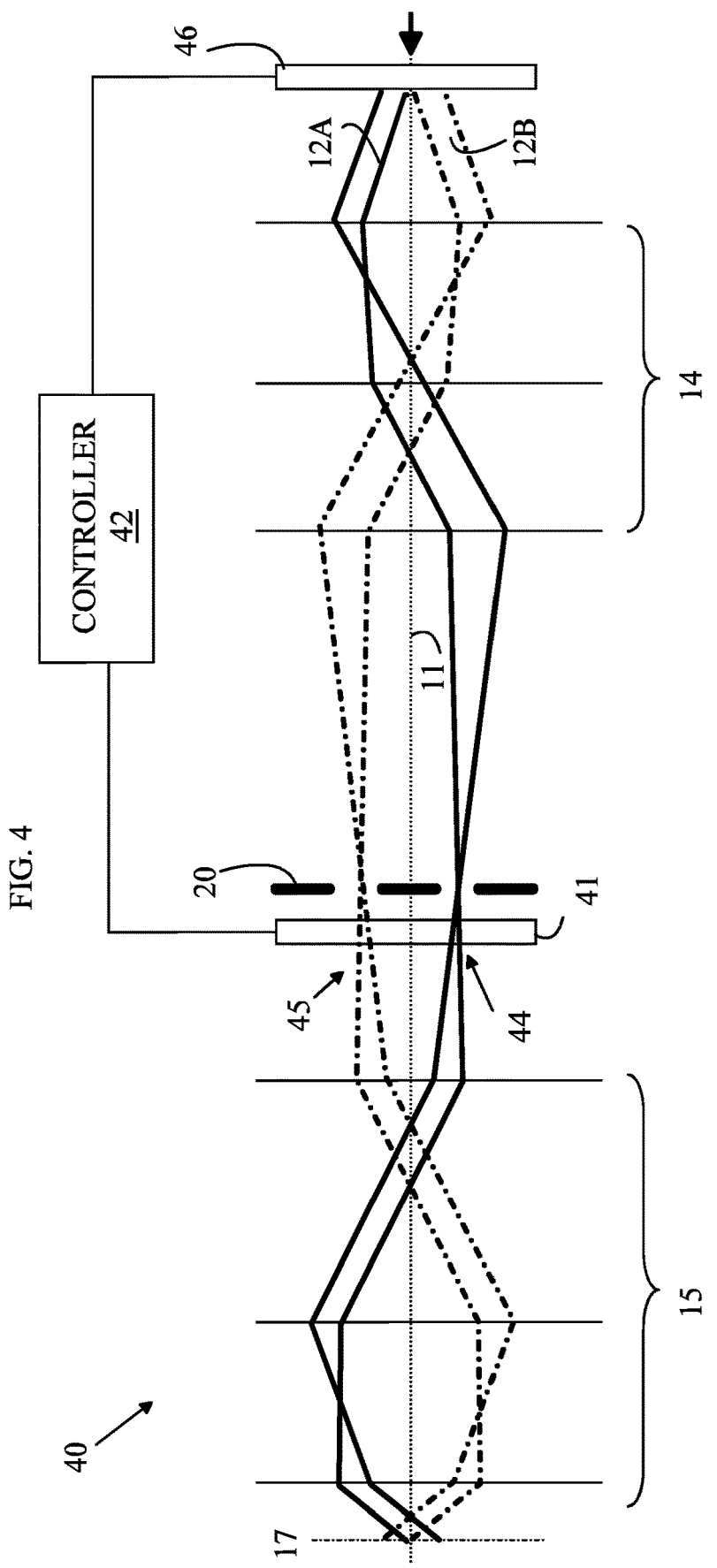
FIG. 4 illustrates one exemplary embodiment of an SIM illumination source according to the present invention.

Refer now to FIG. 4, which illustrates one exemplary embodiment of an SIM illumination source according to the present invention. To simplify the following discussion, the elements of illumination system 40 that serve functions analogous to those shown in illumination system 10 of FIG. 1 have been given the same numeric designations. Illumination system 40 includes an SLM 41 that introduces a relative phase shift between beams 12A and 12B in response to signals from controller 42. The phase shift introduced into beam 12B as it passes through region 45 is different from the phase shift introduced into beam 12A as it passes through region 44. A change in phase shift results in the illumination pattern on sample 17 changing as the light and dark fringes of the interference pattern shift as a function of the relative phases of beams 12A and 12B. Hence, by stepping the relative phases in the two beams through a series of values, controller 42 effectively scans the structured light pattern over the region of interest. Controller 42 also operates SLM 46 that sets the orientation of beams 12A and 12B.

Unfortunately, the efficiency of an SLM is less than 100 percent. Hence, some of the light passing through region 45 will not be phase shifted. Similarly part of the light through region 44 will not be phase shifted. Hence, the resulting interference pattern on the sample will be a more complex interference pattern than desired. Accordingly, an arrangement in which the non-phase shifted light is removed from the beams is preferred.

The non-phase shifted light will be referred to as the non-processed light in the following discussion. In the case of transmissive SLM, the non-processed light passes through the SLM as if the SLM was a transparent sheet of material. In the case of a reflective SLM, the non-processed light is reflected from the SLM as if the SLM was a mirror.

Figure 5:
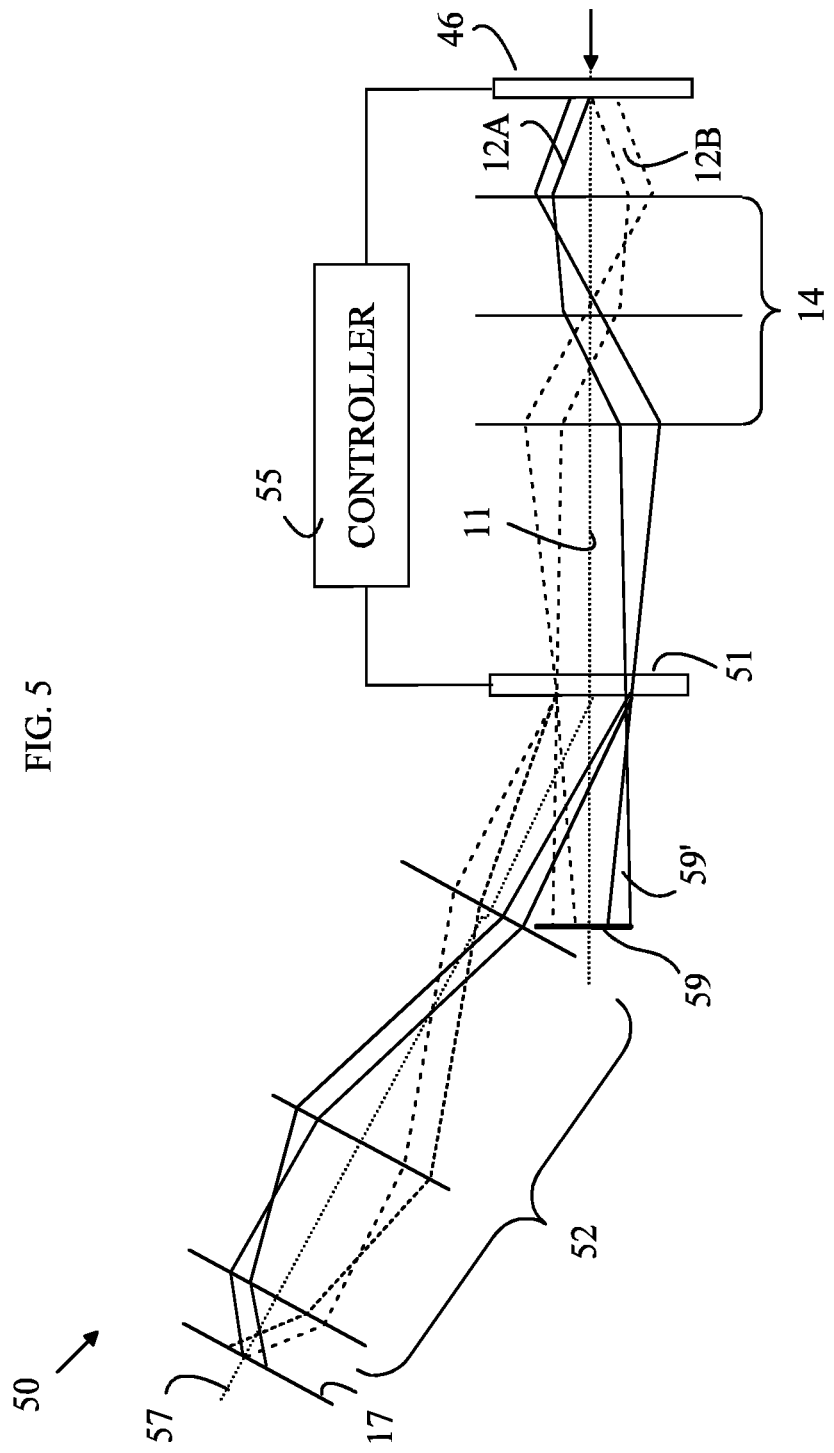
FIG. 5 illustrates one embodiment of an SIM illumination system according to the present invention that utilizes beam steering to separate the non-phase shifted light from the phase shifted light.

These problems can be overcome by using the light steering capability of an SLM in addition to the phase shifting ability. Refer now to FIG. 5, which illustrates one embodiment of an SIM illumination system according to the present invention that utilizes beam steering to separate the non-phase shifted light from the phase shifted light. To simplify the following discussion, the elements of illumination system 50 that serve functions analogous to those shown in illumination system 10 of FIG. 1 have been given the same numeric designations. Illumination system 50 generates two coherent light beams 12A and 12B which are focused on SLM 51. SLM 51 is programmed to steer these light beams such that the optical axis of the steered beams shown at 57 is rotated relative to optical axis 11 of the beam impinging on SLM 51. The non-processed light, such as beam 59' is absorbed by a beam blocker 59. The steered beams are then imaged onto sample 17 by optical assembly 52 in a manner analogous to the imaging provided by lens assembly 15 in FIG. 1.

SLM 51 is also programmed to generate a variable phase difference between the rotated beams. This phase difference is controlled by controller 55 which changes this phase difference through at least three different phase differences to cause the interference pattern on sample 17 to effectively shift across sample 17 in a manner analogous to moving the sample in an orthogonal direction relative to axis 57.

The arrangement shown in FIG. 5 assumes that beams 12A and 12B are in the plane of the drawing. As noted above, the scanning pattern must be repeated for at least three different orientations of the two beams about axis 57. Controller 55 also controls the orientation of the two beams about axis 11 by changing the orientation of the diffraction grating on SLM 46. For each orientation, SLM 51 must also be reprogrammed to rotate the steering angle such that the steered beams also remain in the same plane as the beams leaving SLM 46. This ensures that optical assembly 52 can remain fixed. For each orientation, the effective scanning direction of the interference pattern across sample 17 changes while remaining orthogonal to axis 57. Hence, illumination system 50 does not require either sample or the illumination system to physically move during the image acquisition.

Illumination system 50 utilizes a transmissive SLM to steer the beams away from the unaltered portion of the input light and provide the phase differences between the two beams. However, embodiments in which a reflective SLM can be used to provide the beam steering and phase differences can also be constructed.

Figure 6:
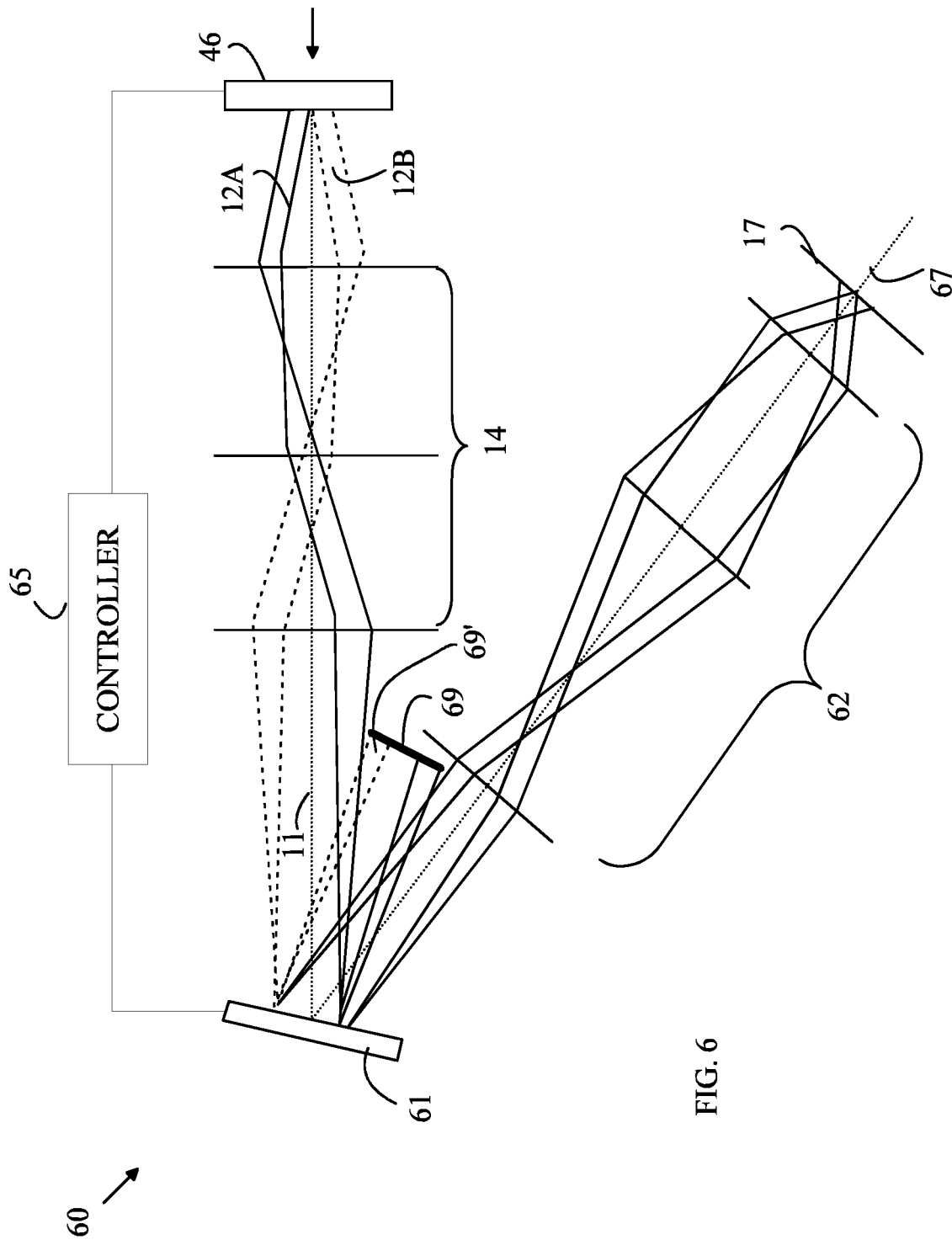
FIG. 6 illustrates one embodiment of an SIM illumination system according to the present invention that utilizes beam steering provided by a reflective SLM to separate the non-phase shifted light from the phase shifted light.

Refer now to FIG. 6, which illustrates one embodiment of an SIM illumination system according to the present invention that utilizes beam steering provided by a reflective SLM to separate the non-phase shifted light from the phase shifted light. To simplify the following discussion, the elements of illumination system 60 that serve functions analogous to those shown in illumination system 10 of FIG. 1 have been given the same numeric designations. Illumination system 60 generates two coherent light beams 12A and 12B which are focused on SLM 61. SLM 61 is programmed to steer these light beams such that the optical axis of the steered beams shown at 67 is rotated relative to optical axis 11 of the beam impinging on SLM 61. The non-processed light, such as beam 69' is absorbed by a beam blocker 69. The steered beams are then imaged onto sample 17 by optical assembly 62 in a manner analogous to the imaging provided by lens assembly 15 in FIG. 1. Controller 65 operates both SLM 46 and SLM 61.

As noted above, to provide an SIM image, three two-beam orientations about the optical axis and three or more different relative phase shifts between the two beams for each orientation are required. The time needed to execute these nine or more beam configurations is, hence, an important consideration in the choice of SLMs utilized to generate and modulate the beams. In addition, cost is also an important consideration in many applications. The type of SLM that is utilized impacts both of these factors. The time to switch between configurations for an SLM is a significant factor in the time needed to complete the full set of configurations.

One class of SLMs is organized as an array of "pixels" in which the phase or phase and amplitude of the light passing through that pixel is altered independently of processing provided by the other pixels in the array by the control signals to the SLM. In a binary transmissive SLM, each pixel has two possible states. In the first state, the light passing through the SLM is not altered. In the second state, the light passing through the pixel is altered by changing the phase or phase and amplitude of the light in a predetermined manner. The phase shift or phase and amplitude of the processed light is the same for all pixels in the array that are in the second state. A binary reflective SLM operates in an analogous manner. That is the light reflected from each pixel is either unaltered or a predetermined phase or phase and amplitude change is imparted to the processed light. It should be noted that in each type of SLM, the "fill factor" of the active portion of the pixel is less than 100 percent, and hence, even in the second state, some light is transmitted or reflected without experiencing the predetermined change.

In contrast a multi-level SLM is defined to be an SLM in which the processing provided by each pixel can be set independently and more than two phase shifts or phase and amplitude shifts can be imparted by each pixel to the light processed by that pixel. While multi-level SLMs provide more flexibility in the light modulation provided by the SLMs, the multi-level SLMs have higher costs and require significantly longer to settle into a new configuration than a binary SLM.

For the purposes of the following discussion, the SLM that creates the beam pairs from the incident light beam will be referred to as the generator SLM in the following discussion. SLM 202 shown in FIG. 2A and SLM 46 shown in FIGS. 4-6 are examples of generator SLMs. In contrast, an SLM that imparts the variable phase difference between the beams will be referred to as a modulator SLM. SLMs 41, 51, and 61 are examples of modulator SLMs.

In one aspect of the invention, a binary reflective SLM is used for the generator SLM and a multi-level SLM is used for the modulator SLM. The sequence of beam configurations is generated by holding the state of the modulator SLM constant while cycling through the configuration states of the generator SLM. While this configuration reduces the imaging time and cost of the illumination system, the binary reflective SLM can generate additional pairs of beams from the higher order diffractions of the diffraction grating implemented with the binary reflective SLM. These unwanted beams will exit the generator SLM at higher angles than the first order beams utilized by the present invention. The unwanted beams will, in general, be focused to points at locations different from the points at which the desired beams are focused. In one embodiment, the higher order beams that enter optical assembly 14 are blocked by placing a mask within optical assembly 14 with openings that pass the desired beams.

Figure 7:
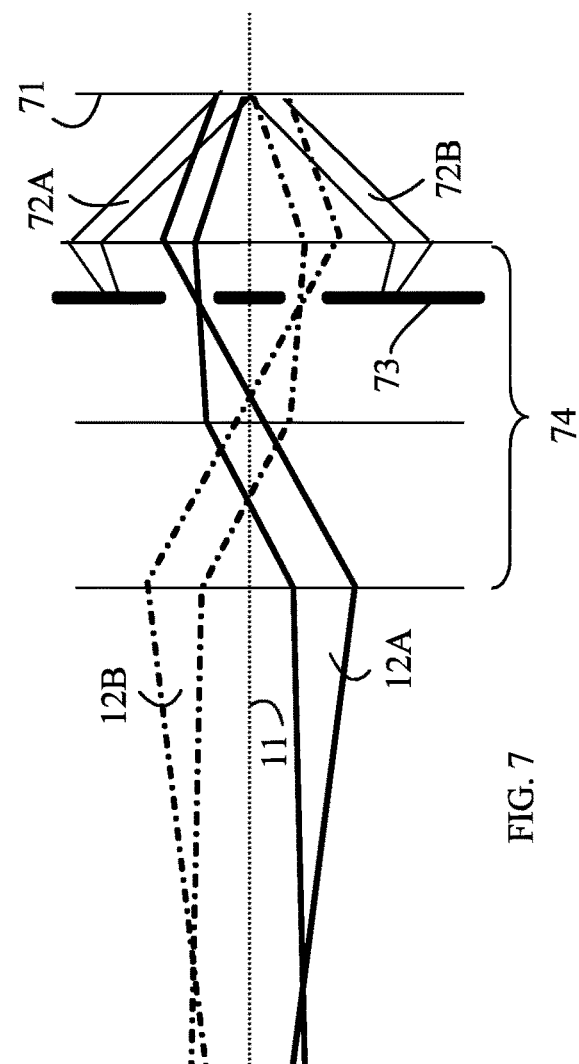
FIG. 7 illustrates a portion of an embodiment of an illumination light source according to the present invention in which a higher order beam pair is blocked by a mask.

Refer now to FIG. 7, which illustrates a portion of an embodiment of an illumination light source according to the present invention in which a higher order beam pair is blocked by a mask. In this embodiment, SLM 71 generates a second pair of beams from the second order diffraction pattern implemented with SLM 71. These unwanted beams are within the acceptance aperture of optical assembly 74, and hence, pose a problem. A mask 73 is positioned to pass the desired beam pair 12A and 12B at a point in optical assembly 74 at which these beams are focused to a point. Since beams 72A and 72B are emitted at a significantly steeper angle, these beams are focused to points further from SLM 71, and hence are blocked by mask 73. In one aspect, mask 73 is configured in a manner analogous to mask 37 shown in FIG. 3A.

Figure 8A:
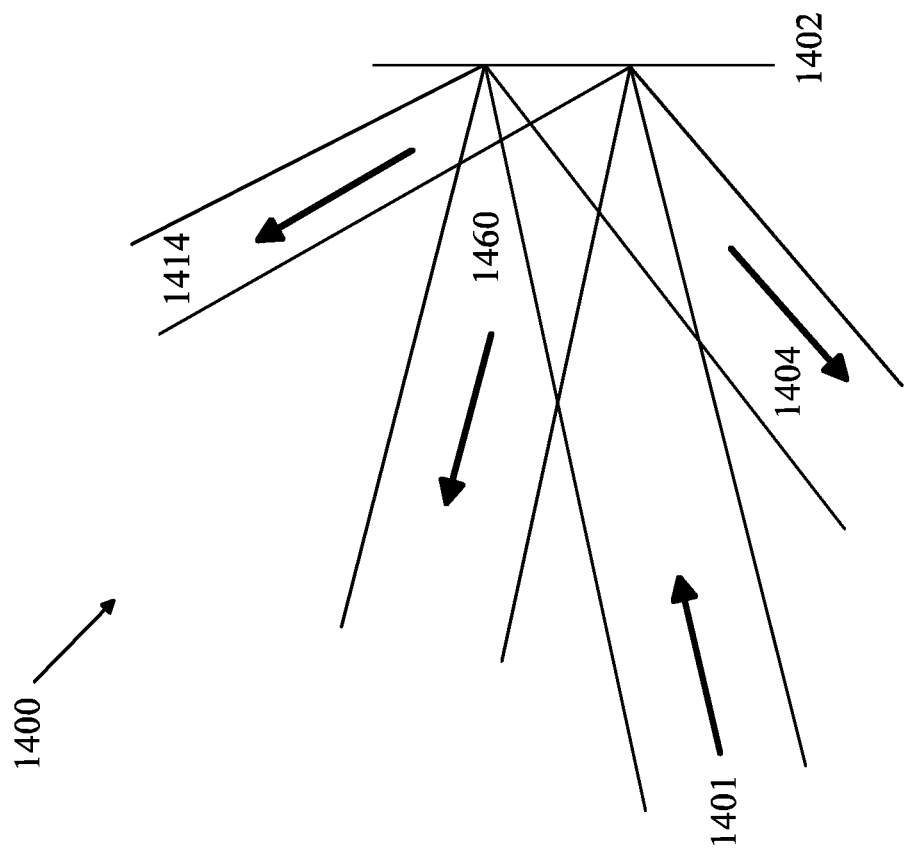
FIGS. 8A and 8B illustrate another embodiment of a light source according to the present invention.
Figure 8B:
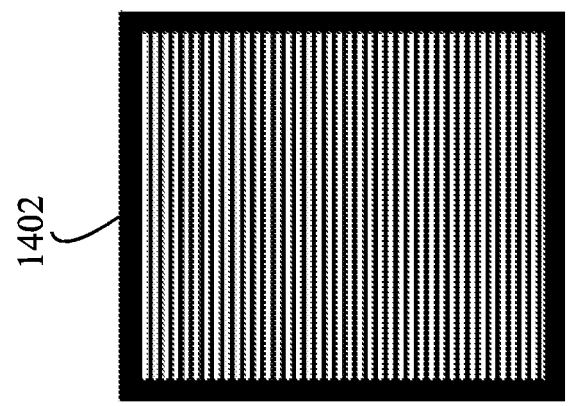

The above-described embodiments utilize a transmissive generator SLM. However, embodiments in which the generator SLM is a reflective SLM can also be constructed. Refer now to FIGS. 8A and 8B, which illustrate another embodiment of a light source according to the present invention. FIG. 8A is a cross-section view of light source 1400, and FIG. 8B is an end view of SLM 1402 shown in FIG. 8A. Light source 1400 utilizes a reflective SLM to provide the light beams shown in FIG. 8A. Refer now to FIG. 8A. The incoming light beam 1401 is reflected from a reflective SLM 1402 that has the diffraction grating pattern shown in FIG. 8B. The incoming light is diffracted into beams 1414 and 1404. Beam 1460 being a reflected beam that is not diffracted. To simplify the drawing, the higher order diffracted beams analogous to beams 72A and 72B shown in FIG. 7 have been omitted; however, it is to be understood that such higher order diffracted beams are generated.

Embodiments of the present invention that provide illumination for three-dimensional SIM can also be constructed. In three-dimensional SIM, a center beam that is coherent with respect to the other two beams is also present. The center beam can be generated by generator SLM from the laser beam that passes through the grating without being diffracted. Referring to FIG. 5, the center beam travels along optical axis 11 and is redirected to optical axis 57 by SLM 51. Referring to FIG. 6, the center beam is propagated along optical axis 11 and is redirected to optical axis 67 by reflective SLM 61.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An illumination system comprising:
   a generator spatial light modulator (SLM) positioned to receive an incident light beam and adapted to generate first and second coherent light beams, each beam being characterized by a phase and a first light beam optical axis in a plane containing said first and second coherent light beams, said first and second coherent light beams being characterized by an angle of rotation about said first light beam optical axis;
   a first optical system that images light leaving said generator SLM on a modulator SLM that alters said phase of one of said first and second coherent light beams to generate a relative phase difference characterized by a phase-difference value;
   a second optical system that processes light leaving said modulator SLM into first and second collimated beams having said phase difference and directing said first and second collimated beams onto a sample to be illuminated such that said first and second collimated beams interfere on said sample and strike said sample from different directions; and
   a controller that causes said relative phase difference to change through a plurality of different phase-difference values.

2. The illumination system of claim 1 wherein said controller causes said angle of rotation to change through three different angular values for each of said plurality of phase-difference values.

3. The illumination system of claim 1 wherein said modulator SLM comprises a transparent SLM.

4. The illumination system of claim 1 wherein said modulator SLM comprises a reflective SLM.

5. The illumination system of claim 1 wherein said modulator SLM steers said first and second coherent light beams to a path characterized by a second light beam optical axis, said second light beam axis being disposed at an angle to said first light beam optical axis.

6. The illumination system of claim 5 wherein said second light beam optical axis lies in the same plane as said first light beam optical axis and said first and second coherent light beams.

7. The illumination system of claim 5 further comprises a beam block that prevents light that has not been steered by said modulator SLM from reaching said sample.

8. The illumination system of claim 1 wherein said generator SLM comprises a binary SLM.

9. The illumination system of claim 8 wherein said generator SLM generates third and fourth coherent light beams that enter said first optical system at an angle different from said first and second coherent light beams, respectively, said first optical system further comprises a beam block that prevents said third and fourth coherent light beams from reaching said modulator SLM.

10. The illumination system of claim 2 wherein said controller causes said angle of rotation to assume three different angular values for each phase-difference value prior to changing said phase-difference value.

11. The illumination system of claim 1 wherein said generator SLM also generates a third coherent light beam that propagates along said first light beam optical axis, said modulator SLM steering said third coherent light beam to a path characterized by a second light beam optical axis, said second light beam optical axis being disposed at an angle to said first light beam optical axis.

12. A method for operating an illumination system to illuminate a sample, said method comprising causing said illumination system to:
- generate first and second collimated coherent light beams, each of said first and second collimated coherent light beams being characterized by a phase and a first light beam optical axis in a plane containing said first and second coherent light beams, said first and second collimated coherent light beams being characterized by an angle of rotation about said first light beam optical axis;
- alter said phase of one of said first and second collimated coherent light beams to generate a relative phase difference;
- cause said first and second collimated coherent light beams to strike said sample at different angles to generate an interference pattern on said sample; and
- repeat said generating said first and second collimated coherent light beams for a plurality of different phase-difference values.

13. The method of claim 12 wherein said angle of rotation changes through three different angular values for each of said plurality of different phase-difference values.

14. The method of claim 12 further comprising generating a third collimated coherent light beam that propagates along said first light beam optical axis and impinges on said sample so as to interfere with said first and second collimated coherent light beams.

* * * * *